United States Patent [19]
Tanaka et al.

[11] Patent Number: 4,881,823
[45] Date of Patent: Nov. 21, 1989

[54] RADIATION THERMOMETRY

[75] Inventors: Fumio Tanaka, Fukuoka, Japan; David P. DeWitt, West Lafayette, Ind.

[73] Assignee: Purdue Research Foundation, West Lafayette, Ind.

[21] Appl. No.: 175,051

[22] Filed: Mar. 29, 1988

[51] Int. Cl.$^4$ .................................................. G01J 5/52
[52] U.S. Cl. ................................ 374/126; 374/128; 374/134; 374/9; 356/45
[58] Field of Search .............. 374/126, 128, 127, 139, 374/129, 9; 356/45; 369/557

[56] References Cited

U.S. PATENT DOCUMENTS

| | | | |
|---|---|---|---|
| 3,537,314 | 11/1970 | Svet | 73/355 |
| 3,608,817 | 9/1971 | Svet | 236/78 |
| 3,611,805 | 10/1971 | Hishikari | 374/127 |
| 3,616,592 | 10/1971 | Murray | 374/126 |
| 4,020,695 | 5/1977 | Roney | 374/126 |
| 4,172,383 | 10/1979 | Iuchi | 374/126 |
| 4,498,765 | 2/1985 | Herve | 374/126 |
| 4,561,786 | 12/1985 | Anderson | 374/129 |
| 4,579,461 | 4/1986 | Rudolph | 374/9 |
| 4,708,493 | 11/1987 | Stein | 374/126 |

FOREIGN PATENT DOCUMENTS

| | | | |
|---|---|---|---|
| 1179733 | 10/1964 | Fed. Rep. of Germany | 374/127 |
| 3115887 | 11/1982 | Fed. Rep. of Germany | 374/126 |
| 0123982 | 10/1978 | Japan | 374/128 |
| 0144513 | 11/1980 | Japan | 374/126 |
| 0162028 | 12/1980 | Japan | 374/9 |
| 0035026 | 4/1981 | Japan | 374/128 |
| 0030916 | 2/1982 | Japan | 374/9 |
| 0153228 | 9/1982 | Japan | 374/127 |
| 0169038 | 10/1983 | Japan | 374/127 |
| 0152924 | 8/1985 | Japan | 374/126 |
| 0165524 | 8/1985 | Japan | 374/126 |
| 0386269 | 6/1973 | U.S.S.R. | 374/127 |

OTHER PUBLICATIONS

Tskhai, N. S., "Spectral Method of Determining the Emissivity of Hot Surfaces", J. Appl. Spectrose (USA) vol. 27, No. 3, (Sep. 1977)(Publ 3–78), 1111–1115.

Barber & Brown, "Establishing a Calibration Laboratory for Industrial Radiation Thermometry," *Applications of Radiation Thermometry* ASTM STP 895, Richmond & DeWitt, Eds., Philadelphia, 1985, pp. 39–60.

Anderson, "Methods of Calibration at a National Laboratory," *Applications of Radiation Thermometry* ASTM STP 895, Richmond & DeWitt, Eds., Philadelphia, 1985, pp. 24–38.

*Primary Examiner*—William A. Cuchlinski Jr.
*Assistant Examiner*—Thomas B. Will
*Attorney, Agent, or Firm*—Kenyon & Kenyon

[57] ABSTRACT

A method of determining true temperatures of a heated target material by its radiation based on prior knowledge of an emissivity function which describes the relationship between two spectral emissivities for the target material, comprising measuring two radiances corresponding to said two spectral emissivities from the target material, assuming a temperature of the target material, then calculating a pair of emissivities which satisfy the emissivity fuction whereat the assumed temperature is the true temperature of the target material.

10 Claims, 15 Drawing Sheets

RADIATION THERMOMETRY

FIELD OF THE INVENTION

This invention relates to a novel method for determining the surface temperature of a heated object whose surface condition is unknown.

The method according to the present invention incorporates the measurement of two radiation signals from the heated object measured at different wavelengths or at different spectral conditions into an algorithm to calculate the temperature and emissivities of the heated object.

BACKGROUND OF THE INVENTION

Radiation thermometry enables remote and quick measurement of the temperature of heated objects in industrial environments as well as in scientific research.

Conventional methods for measuring the temperature of a surface by radiation thermometry require knowledge of the spectral emissivity of the heated object, i.e. the effectiveness of the surface to radiate compared to a blackbody or a perfect radiator. In many industrial processes, especially those involving metals, e.g. steel, aluminum, etc. and electronic materials, the surface spectral emissivity of the object is not known and often shows significant variation during processes such as rolling, forging, casting, cutting, etc. due to phase changes, surface alloying, surface roughing, etc. In many of these processes, accurate temperature control is necessary in order to achieve high productivity, high product quality and/or desired properties of the product. Because of the variation of the spectral emissivity during these processes, however, conventional radiation thermometry cannot be relied upon for true temperature measurement. As a result, conventional methods for measuring temperature by radiation thermometry have been modified in an attempt to minimize spectral emissivity uncertainty or variations. These methods can be classified into two groups (1) "hybrid" methods which require the use of auxiliary devices such as mirrors, external radiation sources, etc. and (2) "compensation" methods, wherein the spectral emissivity is prescribed by some function based upon apriori or assumed information about the target material.

The "hybrid" methods are complicated by the need to install auxiliary equipment in the vicinity of the target material. In many industrial operations, the environment is harsh, placing severe requirements on the equipment. Besides being costly, this method generally requires sophisticated radiometric analysis and in-mill testing to evaluate. Furthermore, the method is usually restricted to a very specific or limited application.

Conventional "compensation" methods have been demonstrated for very specific situations but have not been adapted to industrial practice. One common compensation method, spectral or single-color pyrometry, is based on the assumption of constant emissivity of an object. It is known that accurate temperature measurement by single-color pyrometry cannot be expected when applied to a material whose surface is undergoing changes.

Another common compensation method, ratio pyrometry, assumes a gray body condition for which the ratio of two spectral emissivities is assumed constant and/or known. However, since the emissivity is regarded as a very complex function of wavelength, temperature, surface roughness, chemical composition of material, degree of oxidation or alloying, etc., most materials show a complicated variation in the ratio of two emissivities and thus ratio pyrometry results in unreliable temperature measurement when applied to a material undergoing surface changes.

In recent years, multispectral methods, which use more than two wavelengths, have been studied seriously. These methods apply various expressions of emissivity as a function of wavelength. For example, using an emissivity-wavelength linear relationship, it is possible to predict emissivities using exact or least-squares techniques and thus infer surface temperatures. Such a technique is cumbersome and the outcome is reliable only for stable materials such as noble metals and ceramics. A further disadvantage of these methods is the requirement for three or more wavelengths which seriously complicates instrumentation for an industrial environment.

SUMMARY OF THE INVENTION

The present invention is directed to a novel radiation thermometric method by which the temperature and spectral emissivities of an object can be accurately, simply and reliably determined without the need for auxiliary devices or complex mathematical manipulations. Particularly, this invention relates to a novel radiation thermometric method for target materials which are undergoing surface changes during processes such as rolling, forging, casting, cutting, etc. during which two spectral radiances are measured at different measuring conditions and by using prior knowledge of the spectral emissivities corresponding to the measured radiances an accurate target material temperature is readily ascertained.

In one aspect of the invention, the two spectral radiances are measured at different wavelengths. In another aspect, the two radiances are measured at different viewing angles to the surface of the object. In still another aspect of the invention, the two radiances are measured at different directions of polarization.

Radiation thermometry typically employs a spectral radiometer to view a target material which has been calibrated to correctly indicate the temperature of a theoretical blackbody, i.e. a surface having a spectral emissivity, $\epsilon$, equal to one. However, the spectral emissivity $\epsilon$ of a real surface of a target material is generally not equal to one and the true temperature T of the target material must be calculated from the apparent spectral radiance temperature $T_\lambda$ measured by the radiometer. For example, when viewing the surface of a target material having an emissivity $\epsilon_\lambda$ less than one, the indicated or apparent spectral radiance temperature T detected by the radiometer will be less than the true temperature T of the surface of the target material. Therefore, a temperature equation must be employed to infer a true temperature T from the measured radiance temperature $T_\lambda$.

For a spectral radiometer which operates with a narrow passband, the temperature measurement equation follows directly from equating a spectral radiance L emitted by the object to the spectral radiance at the apparent temperature $T_\lambda$ indicated by the radiometer:

$$L_b(\lambda, T_\lambda) = \epsilon_\lambda L_b(\lambda, T) \quad (1)$$

where the blackbody function is defined by the Planck's spectral distribution or Wien's law as:

$$L_b(\lambda,T) = C_1/\lambda^5 \exp(-C_2/\lambda T) \tag{2}$$

where $C_1$ is the first radiation constant and $C_2$ is the second radiation constant. Using Eq. (2) for $L_b(\lambda,T)$ and $L_b(\lambda,T)$, substituting in Eq. (1) and regrouping, the temperature equation has the form $$1/T = 1/T_\lambda + (\lambda/C_2)\ln(\epsilon_\lambda) \tag{3}$$

This relation provides a direct method to infer a true or actual surface temperature T from the indicated or spectral radiance temperature $T_\lambda$, assuming knowledge of the spectral emissivity of the target material at the specifically measured surface condition. However, as described above, the spectral emissivity $\epsilon_\lambda$ is a complex function of wavelength and temperature as well as the characteristics of the surface, such as roughness, oxide layers, etc. and the spectral emissivity at every measured surface condition is not known. The present invention relies upon the prior knowledge of how the spectral emissivity $\epsilon_\lambda$ of a particular material or class of material will change while undergoing a specific process, then by extension of the temperature equation, Eq. (2), to include another wavelength and from apriori knowledge of a spectral emissivity function, $\epsilon_1 = f(\epsilon_2)$, an algorithm is developed which provides for direct determination of the true temperature of the target material independent of the surface conditions.

As will be shown, the present invention provides an accurate, simple and reliable radiation thermometric method by which true temperature and spectral emissivities of a metal object are determined without the need for auxiliary devices or complex mathematical manipulations. In addition, the method of this invention does not require a constant emissivity or a gray body condition of the target material whose temperature is to be measured, but instead, makes use of apriori knowledge of the relationship between two emissivities measured at different spectral conditions.

BRIEF DESCRIPTION OF THE DRAWINGS

FIG. 3b graphically illustrates radiance signals detected by the detectors of FIG. 3a.

FIG. 4b illustrates the optical chopper used in the optical system of FIG. 4a.

FIG. 4c graphically illustrates two radiance signals detected by the optical system of FIG. 4a.

DETAILED DESCRIPTION OF THE INVENTION

As discussed above, the spectral emissivity of a target material is a function of wavelength and temperature as well as the characteristics of the surface, such as roughness, oxide layers, alloys, etc. However, it has been discovered that even if the spectral emissivities vary significantly, the relationship between two emissivities at different wavelengths shows good repeatability regardless of surface conditions, and can be expressed as a polynomial or other mathematical functions in accordance with the present invention.

It has also been discovered that since the spectral emissivity of a target material is also a function of the viewing angle and/or direction of polarization, two emissivities used in accordance with the invention can be defined as ratios of the measured spectral radiances from the target material to the spectral radiances from a black body furnace, when measured at different spectral conditions, i.e. at different wavelengths, different viewing angles, different directions of polarization or different combinations of wavelength, viewing angle and direction of polarization.

Figure 1:
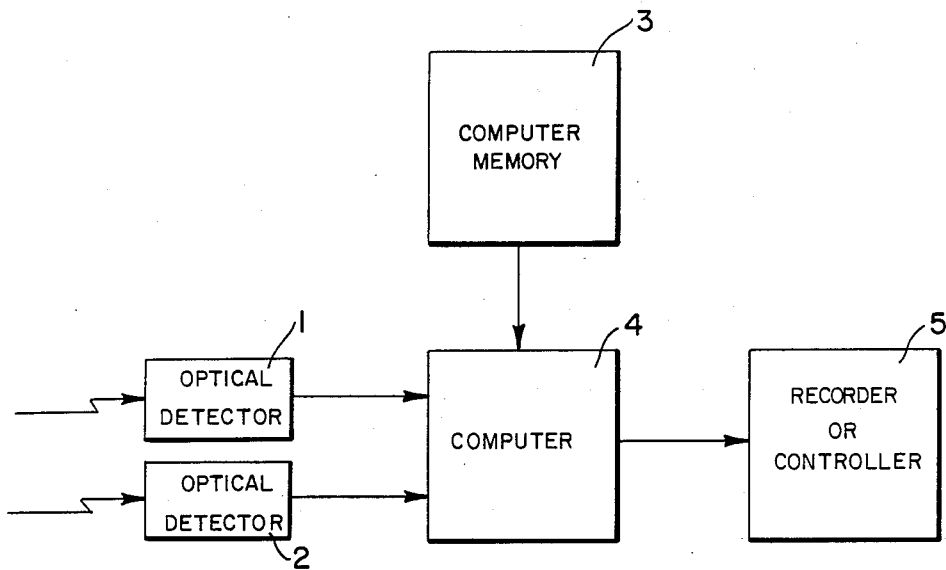
FIG. 1 is a schematic diagram of a radiation thermometric and computing system according to the present invention.

The terms, as used herein, used to describe the method of the present invention are:

$L_i$ - spectral radiance obtained by measurement,
$L_b$ - blackbody spectral radiance,
$\epsilon_i$ - spectral emissivity,
$\lambda_i$ - wavelength,
$K_i$ - constant,
T - true surface temperature of target material, and
$C_2$ - Planck's second radiation constant Referring to the figures, and first to FIG. 1, there is shown a block diagram of a radiation thermometric system employing the method of the present invention.

Optical detectors 1 and 2 measure two spectral radiances from a heated target material (not shown) at different conditions of measurement, for example, at different wavelengths, at different viewing angles, etc. and transfer the measured signals to a computer 4. The detectors 1 and 2 are preferably, though not necessarily, designed for each specific application. For example, if galvannealed steel in an alloying furnace is the target material, then the detectors are preferably set for two different wavelengths, e.g., 1.6 and 3.0 (μm), but are set at the same viewing angle and direction of polarization. Commercially available elements for the detectors include germanium and lead sulfide. Stored within the computer memory 3 are calibration data based on a blackbody furnace, (essential for any radiation thermometric technique) and apriori data relating two emissivities for the heated target material stored in terms of a mathematical expression, e.g., a polynomial function, or simply as a numerical data table. The emissivity data for the target material is generally gathered experimentally or by theoretical analyses prior to use of the present method as will be discussed below with reference to several other figures.

The principles upon which the present method operates can be described as follows.

The spectral radiance $L_i$ at wavelength $\lambda_i = \lambda_l$ measured at a detector, e.g., detector 1 of FIG. 1, when viewing a target material can be expressed in terms of the emissivity $\epsilon_1$ at wavelength $\lambda_1$, as $$L_l = \epsilon_1 L_b(\lambda_1, T) \tag{4}$$

Using Wien's approximation for spectral radiance, equation (4) can be written as follows:

$$L_1 = \epsilon_1 C_1 / \lambda_1^5 exp[-C_2/\lambda_1 T] \tag{5}$$

or $$L_l = \epsilon_1 K_l exp[-C_2/\lambda_1 T] \tag{6}$$

where $C_1$ is the first radiation constant, $C_2$ is the second radiation constant, and $K_1$ is a constant for a detector. In practice, $K_1$ is the function of optical, geometrical, electrical and other parameters for each detector. Correspondingly, a second spectral radiance $L_2$ at wavelength $\lambda_2$ measured at a detector, e.g., detector 2 of FIG. 1, can be written as follows:

$$L_2 = \epsilon_2 K_2 exp[-C_2/\lambda_2 T] \tag{7}$$

Equations (6) and (7), as used herein, are termed "temperature equations."

The relationship between emissivities $\epsilon_1$ and $\epsilon_2$ is determined by solving equations (6) and (7) as follows:

$$ln[\epsilon_1 K_1 / L_1] = C_2 / \lambda_1 T \tag{8}$$

$$ln[\epsilon_2 K_2 / L_2] = C_2 / \lambda_2 T \tag{9}$$

which can be written in the form:

$$[\epsilon_1 K_1 / L_1]^{\lambda_1} = [\epsilon_2 K_2 / L_2]^{\lambda_2} \tag{10}$$

Thus, the relationship of the emissivities $\epsilon_1$ and $\epsilon_2$ can be expressed as:

$$\epsilon_1 = L_1 / K_1 [K_2/L_2]^{\lambda_2/\lambda_1} \epsilon_2^{\lambda_2/\lambda_1} \tag{11}$$

Since it has been discovered that emissivities change as the surface characteristics change, a base condition subscripted with "o" is identified and equations (6) and (7) are rewritten as follows:

$$L_1/K_1 = \epsilon_{1o} exp[-C_2/\lambda_1 T_o] \tag{12}$$

$$L_2/K_2 = \epsilon_{2o} exp[-C_2/\lambda_2 T_o] \tag{13}$$

Raising both sides of equation (13) to the $\lambda_2/\lambda_1$ power and dividing into equation (12), the resultant emissivity relationship will be obtained.

$$L_1/K_1 [K_2/L_2]^{\lambda_2/\lambda_1} = \epsilon_{1o} \epsilon_{2o}^{-\lambda_2/\lambda_1} \tag{14}$$

Substituting equation (11) into equation (14), the following spectral emissivity relationship at one condition relative to another can be defined as:

$$\epsilon_1 = \epsilon_{1o} [\epsilon_2/\epsilon_{2o}]^{\lambda_2/\lambda_1} \tag{15}$$

A curve G, prescribed by equation (15) derived from temperature equations (6) and (7), represents possible values of emissivities $\epsilon_1$ and $\epsilon_2$ for various target material temperatures. Then, if an emissivity function, prescribed by a curve F, is defined for the target material from apriori knowledge as $$\epsilon_1 = f(\epsilon_2) \tag{16}$$

then the intersection of curves F and G represents unique emissivity values satisfying both the emissivity function, equation (16) and temperature equations (6) and (7) or (15), the values which define a true temperature of the target material.

As mentioned above, the relationship between two emissivities of the target material is determined apriori through experiments or theoretical analysis. This emissivity data can be stored in computer memory either as a numerical table or as a polynomial or other mathematical function of the form $\epsilon_1 = f(\epsilon_2)$ $$\text{where } \epsilon_1 = L_1(\lambda_1, \theta_1, P_1)/L_b(\lambda_1, T) \tag{17}$$

$$\text{and } \epsilon_2 = L_2(\lambda_2, \theta_2, P_2)/L_b(\lambda_2, T)$$

and $\theta$ is the viewing angle from the normal to the target material surface, and $P_1$ and $P_2$ denote the direction of polarization and where T is the temperature of the target material and $\epsilon_1$ and $\epsilon_2$ are the spectral emissivities at wavelengths $\lambda_1$ and $\lambda_2$, respectively. The relationship between the spectral emissivities may be specified as a polynomial or other mathematical expression.

The spectral radiances from the object $L_1$ and $L_2$ are measured under specified conditions at viewing angles $\theta_1$, $\theta_2$ measured from the normal to the surface and at polarization conditions denoted by $P_1$ and $P_2$. The blackbody radiances $L_b(\lambda, T)$ are determined by conventional means from observations on a reference blackbody. In addition, at least one measuring condition must be varied for differentiating the two emissivities. Measuring conditions which can be varied include wavelength $\lambda$, detector viewing angle $\theta$, direction of polarization parameters P or any combination of the above.

Since the emissivity function is derived from actual measured values of two emissivities of the target material, more accurate temperature measurement is possible than by conventional spectral and ratio pyrometry which assume either constant emissivity or a constant ratio of emissivities.

Referring again to FIG. 1, the emissivity function can be stored in the computer memory 3 either as a mathematical expression, such as a polynominal function, or as a numerical data table. The computer 4 receives the two spectral radiance signals from detectors 1 and 2, then reads the blackbody calibration data and the emissivity function from memory to calculate the true temperature and spectral emissivities by trial and error using equations (6), (7) and (16). The calculated results are fed to a recorder or temperature controller 5.

Figure 2:
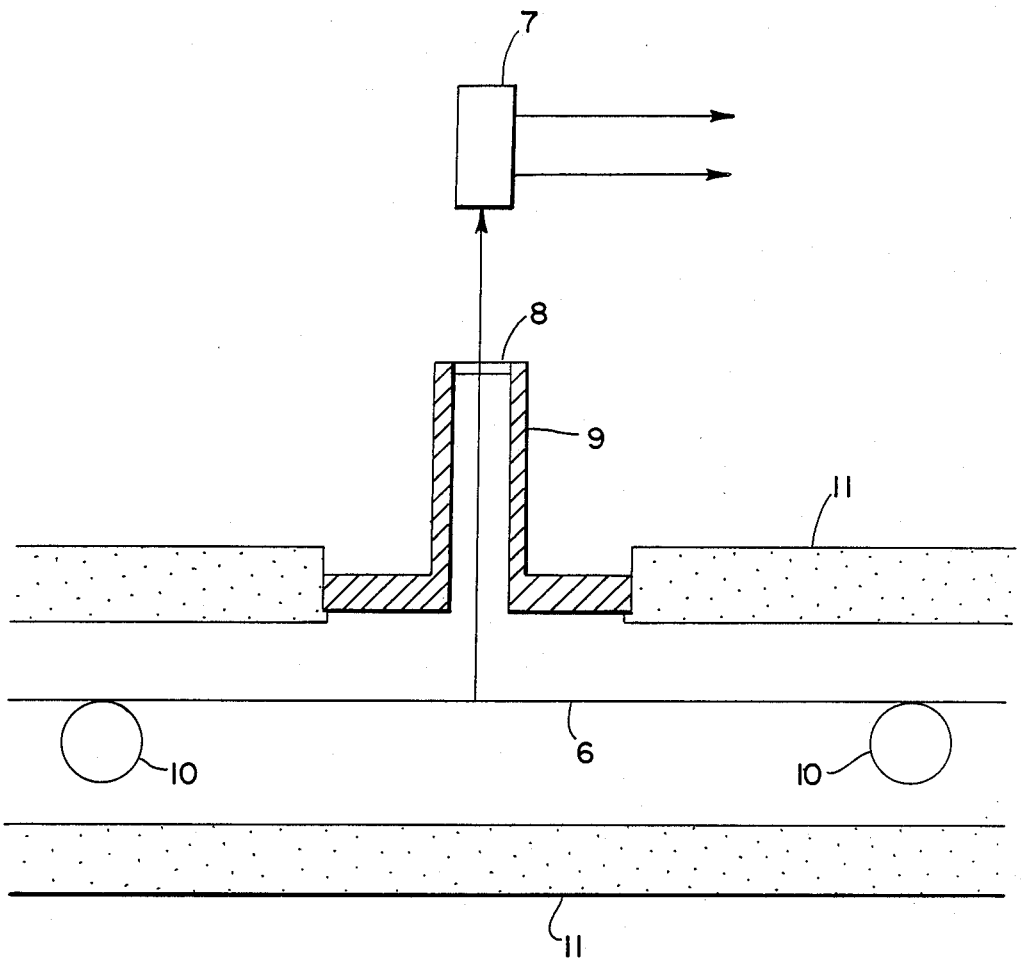
FIG. 2 is an embodiment of the invention in which two radiances at different wavelengths are measured from a direction normal to the target material surface.

FIG. 2 shows one embodiment of the invention adapted to a continuous annealing furnace used in the steel industry. A steel strip 6 is conveyed in a continuous annealing furnace supported by rolls 10. Spectral radiances are measured normal to the steel strip at two different wavelengths by a detector 7 through an optical window 8. A water-cooled flange 9, whose surface is blackened with blackpaint or by oxidation and roughening treatment, is used, if necessary, to reduce stray radiation from furnace wall 11. When stray radiation from the wall is sufficiently small compared to the radiation from the steel strip, a water cooled flange is not necessary. The optical clarity of window 8 may be maintained by use of a purging gas.

Figure 3A:
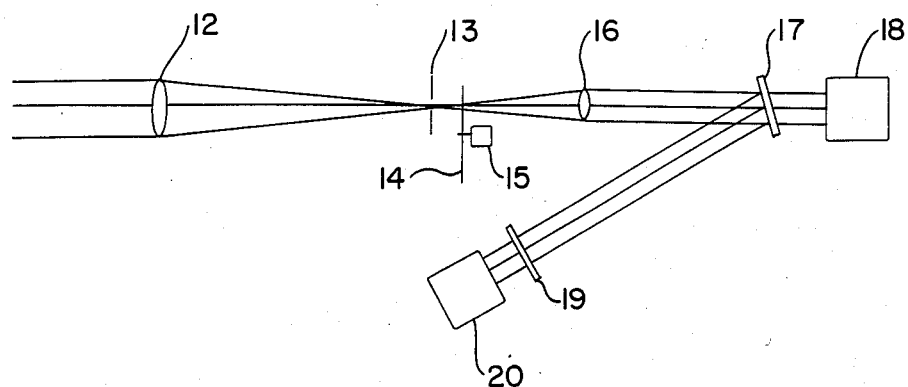
FIG. 3a illustrates an optical system used to detect two radiances at different wavelengths according to the present invention.

FIG. 3a illustrates one example of an optical system of a detection device for use in the method of the invention. Spectral radiation from the target material (not shown) is focused by a lens 12 on an aperture 13, the transmitted flux then being collimated by lens 16 and directed to a detector 18. A bandpass filter 17 transmits one narrow spectral portion of radiation to detector 18, and reflects the remaining portion of radiation toward detector 20. A second bandpass filter 19 transmits another narrow spectral portion of radiation to detector 20. An optical chopper, comprising chopping blade 14 and a motor 15, is used to generate AC signals in order to reduce other noise components.

Figure 3B:
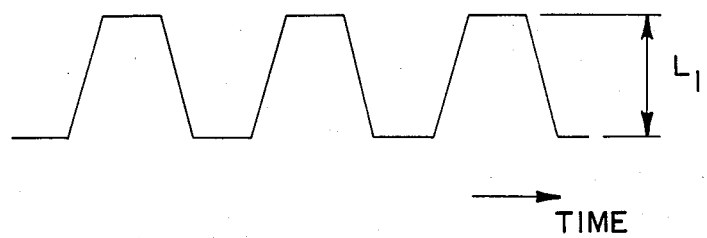
Figure 3B:
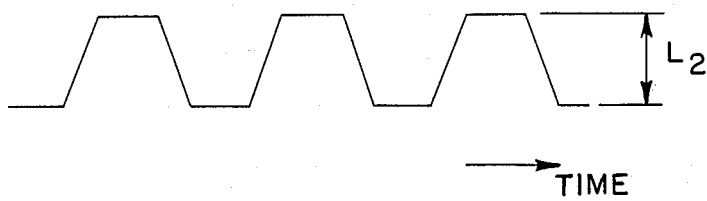

FIG. 3b shows an example of the output signals of detectors 18 and 20 from the optical system of FIG. 3a. Two signals, $L_1$ and $L_2$, which are proportional to two spectral radiances from the target material, are fed to a computer for temperature calculation as described above.

Figure 4A:
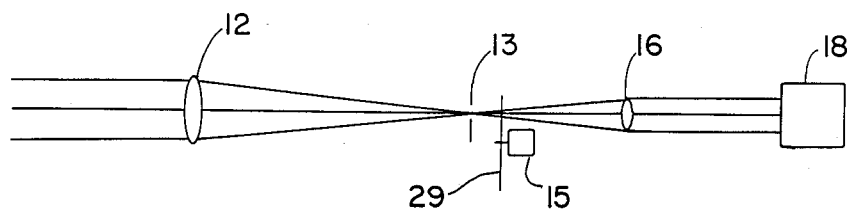
FIG. 4a illustrates an alternate single detector optical system employing an optical chopper with two interference filters having different wavelengths.
Figure 4B:
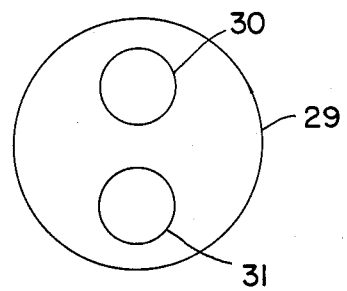
Figure 4C:
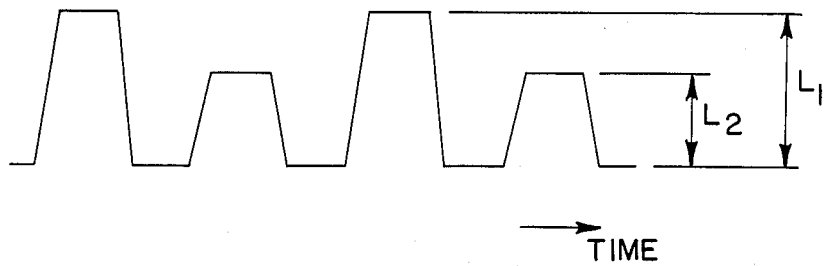

FIGS. 4a and 4b illustrate another example of an optical system for use in the method of the present invention. In this embodiment, chopping blade 29 of the optical chopper has two bandpass filers 30, 31 of different wavelengths to generate a signal as shown in FIG. 4c. Thus, only one detector, capable of detecting spectral radiances at two different wavelengths, is necessary for measurement.

FIG. 4c presents an example of detected signals, $L_1$ and $L_2$, which correspond to two spectral radiances from the target material, measured using a synchronous signal from the optical chopper of FIG. 4b.

Figure 5:
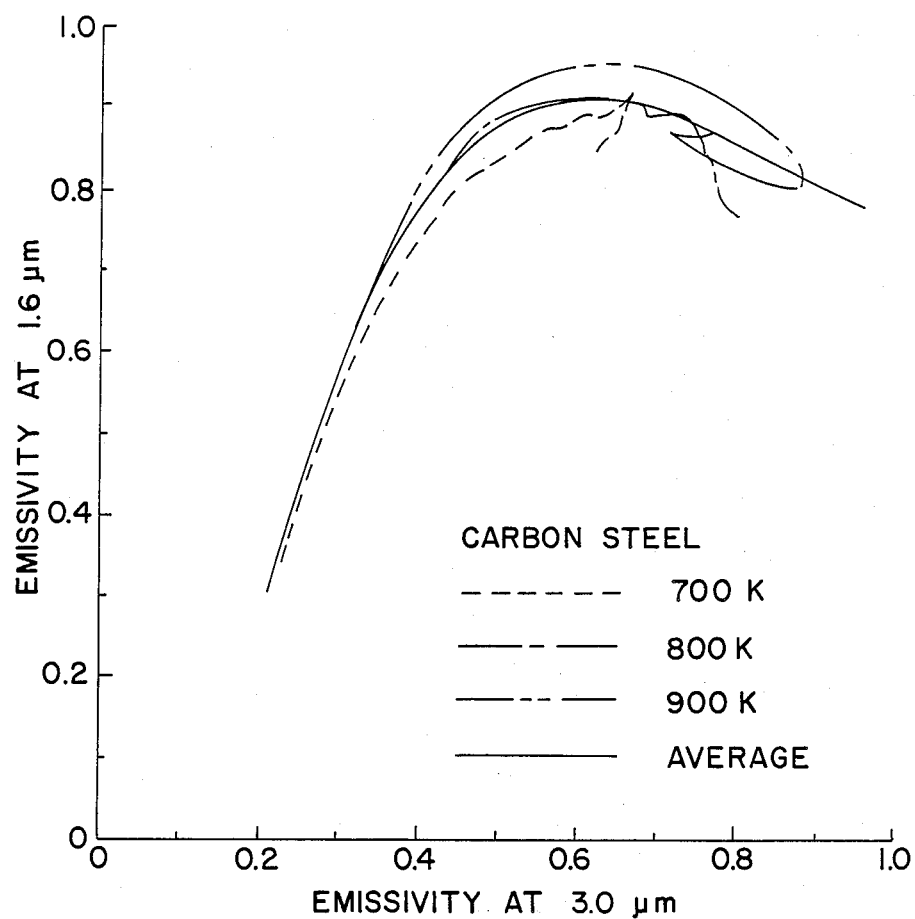
FIG. 5 graphically illustrates the relationship between two emissivities measured for carbon steel as it is oxidized at several different temperatures.

FIG. 5 shows an example of the relationship between two normal spectral emissivities of cold rolled carbon steel as it undergoes oxidation at different temperatures. Normal spectral emissivities at 1.6 μm and 3.0 μm were measured using three steel specimens at temperatures of about 700, 800 and 900K. The steel specimens were oxidized gradually by introducing oxygen in a furnace in which the specimens were heated. Three curves were generated at 700, 800 and 900K which illustrate the variation of spectral emissivities during oxidation. As will be shown in FIG. 12, spectral emissivities during oxidation show a very complex behavior which also changes due to the temperature. However, an average emissivity relationship between two spectral emissivities, designated by solid line in FIG. 5, provides a good approximation to all three temperature curves. The emissivity relationship is thereafter used to generate an emissivity function for calculating the true temperature of the target material according to the method of the invention.

It is not essential for the method of the invention to generate an emmisivity function for each approximate temperature to be measured. Although temperature is one of the parameters which causes a variation in the emissivity of materials, its influence is often much smaller than the effect of changing surface characteristics, e.g. degree of oxidation, alloying, chemical composition, roughness, etc. However, in order to achieve extremely accurate temperature measurements of heated materials, it is preferred that an emissivity function be generated for each approximate temperature to be measured.

Figure 6:
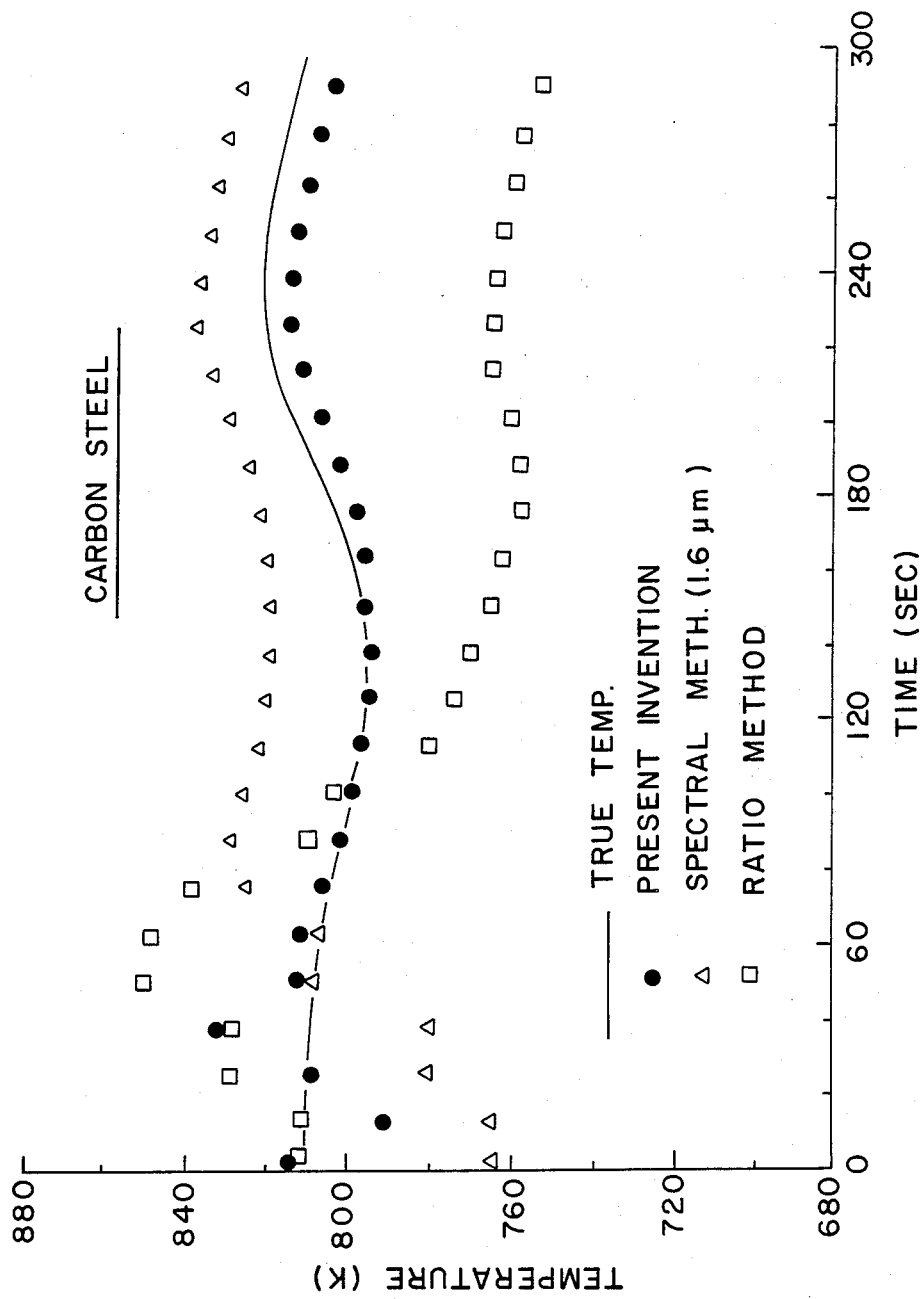
FIG. 6 illustrates temperature measurement of cold rolled steel by the method of the present invention compared to conventional spectral and ratio pyrometric methods.

FIG. 6 shows an example of temperature measurement of cold-rolled carbon steel by the method of the invention as it is oxidized. The relationship between two spectral emissivities at 1.6 μm and 3.0 μm is stored in computer memory as a third order polynomial emissivity function. To compare the results of the method of the invention with those by conventional spectral and ratio pyrometry, the average value of emissivities and the average value of the ratio of two emissivities were also stored in the computer memory. A solid line shows the true temperature of the object measured by a thermocouple attached to the object. Solid circles represent the temperatures measured by the method of this invention, and open triangle and squares represent temperature measurements obtained by conventional spectral pyrometry using 1.6 μm and ratio pyrometry using 1.6 μm and 3.0 μm, respectively.

Since the method of this invention is based on the knowledge of the relationship between two emissivities defined by the emissivity function, quite accurate temperatures are obtained by this invention. As seen, however, much larger temperature errors resulted from conventional spectral and ratio pyrometry, since they are based on the assumption of constant emissivity or a constant emissivity ratio of the target material.

The dominant cause of variation in spectral emissivity for cold-rolled steel is oxidation, and as shown in FIG. 6, the method of this invention is quite advantageous to such kind of radiation thermometric application. It is also known that the spectral emissivity of galvannealed steel during the alloying process shows a significant change. However, the dominant cause of this variation is not oxidation but the change of iron and zinc composition and a surface roughening effect due to the growth of alloy crystal on the surface. However, the method of this invention i also applicable to galvannealed steel with excellent accuracy.

Figure 7:
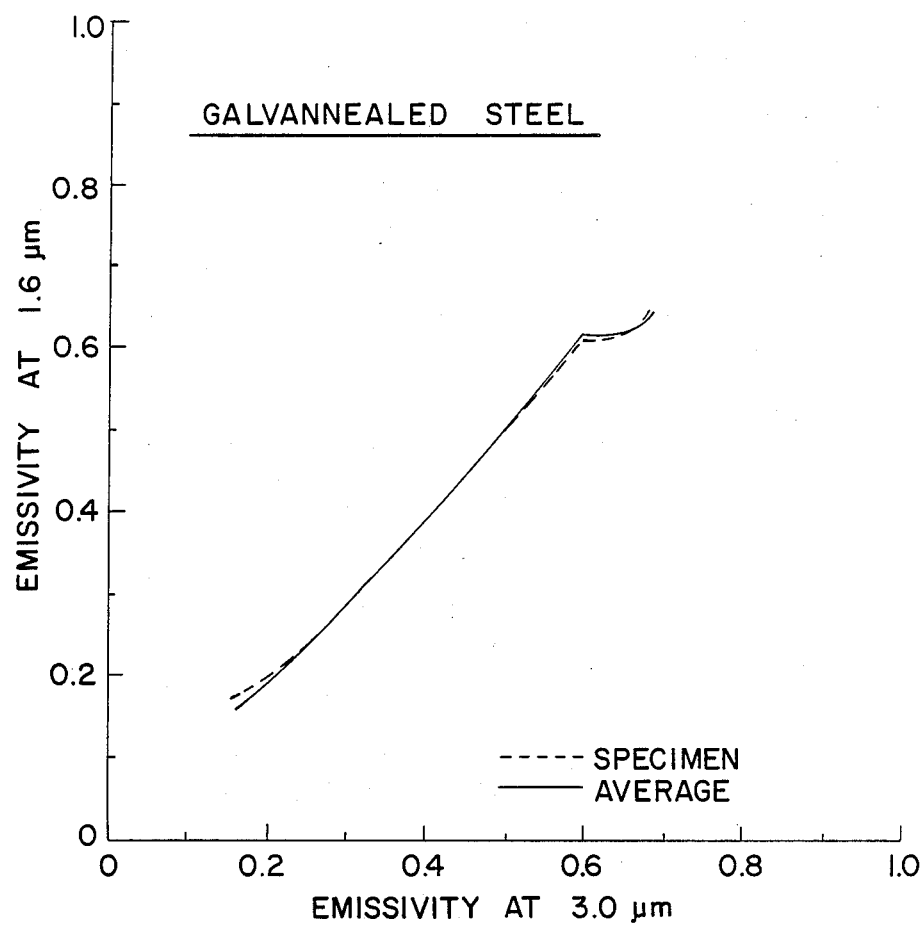
FIG. 7 illustrates the relationship between two emissivities of galvannealed steel during the alloying process.

FIG. 7 shows the relationship between two spectral emissivities at 1.6 μm and 3.0 μm of galvannealed steel as alloying of iron and zinc proceeds on the surface. Four specimens were used for the measurement of the relationship between two emissivities at 720K through 800K for different heating rates, and since these specimens showed fairly good coincidence with each other, only one example of actual data is shown as a dotted line in FIG. 7. A solid line represents the average curve for all four specimens.

Figure 8:
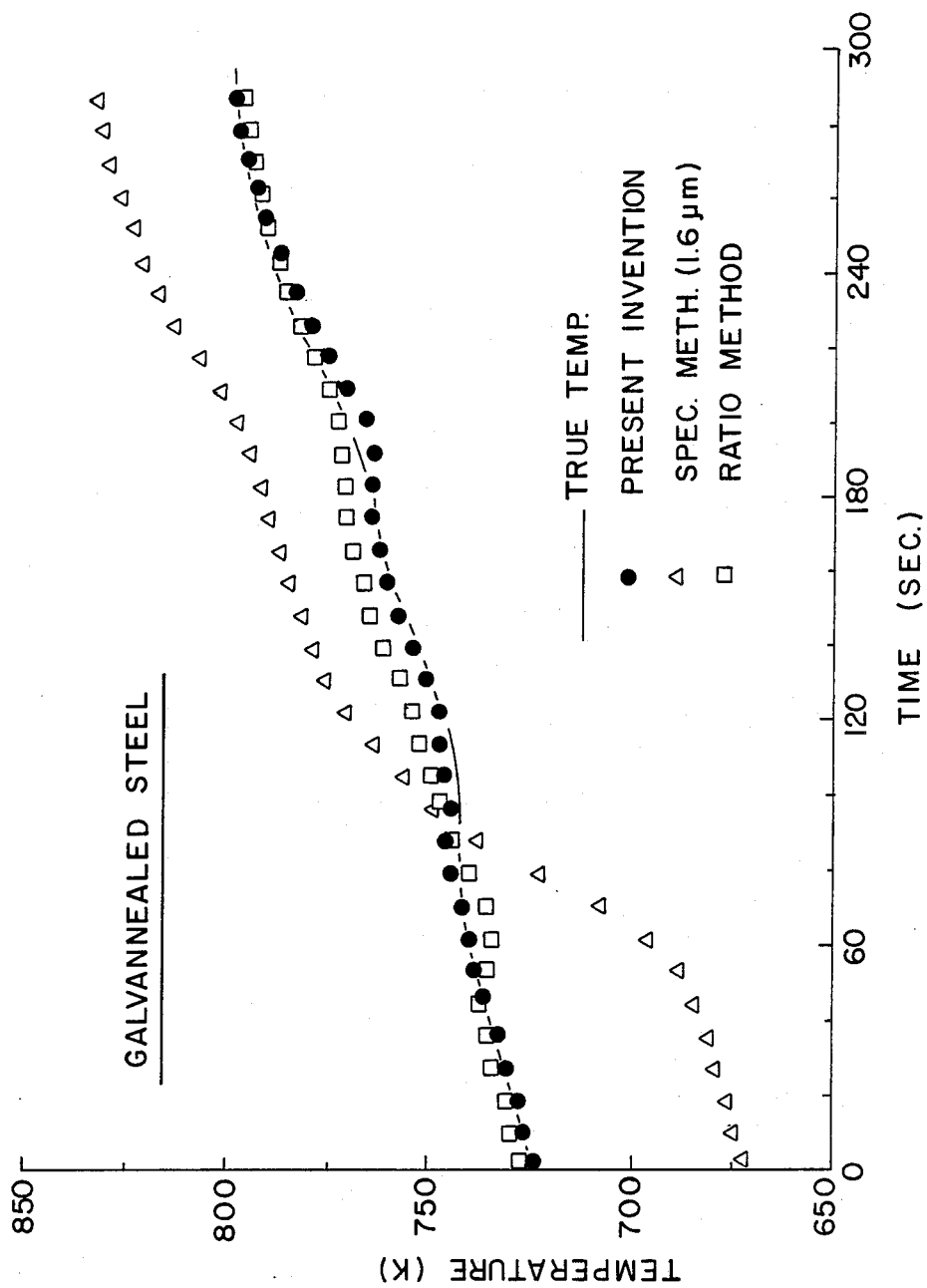
FIG. 8 illustrates temperature measurement of galvannealed steel by the method of this present invention compared to conventional spectral and ratio pyrometry.

FIG. 8 illustrates another example of the improved temperature measurement of galvannealed steel using the method of the present invention. Open triangles and squares represent temperatures measured by conventional spectral and ratio color pyrometry using average values of emissivity and emissivity ratios, respectively. As seen in FIG. 8, the method of the invention provides superior accuracy compared to conventional methods during the galvannealing process.

As stated above, since the spectral emissivity is also a function of viewing angle from the normal to the target material's surface and/or direction of polarization of radiation, other aspects of this invention employ two radiances measured at either different viewing angles or different directions of polarization.

Figure 9A:
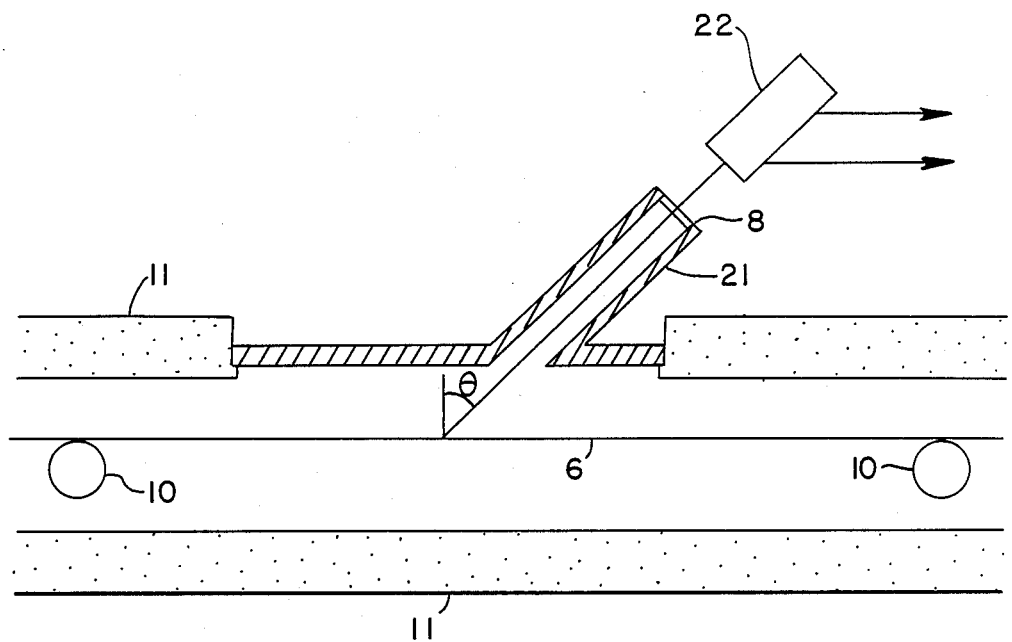
FIG. 9a illustrates an alternate embodiment of the invention in which two radiances at the same wavelength but at different directions of polarization are measured at an oblique angle from the normal to the target material surface.

FIG. 9a illustrates an alternate embodiment of the invention applied to a steel strip 6 in a continuous annealing furnace. Spectral radiances are measured at the same wavelength and at an oblique angle from the normal to the target material surface, but at different directions of polarization by detector 22. A water cooled flange 21 is used to reduce stray radiation from the wall, if necessary, while item 8 denotes a transmitting optical window. The detector viewing angle $\theta$ can be adjusted to optimize the system's performance based on data obtained by experiments as well as practical engineering conditions.

Figure 9B:
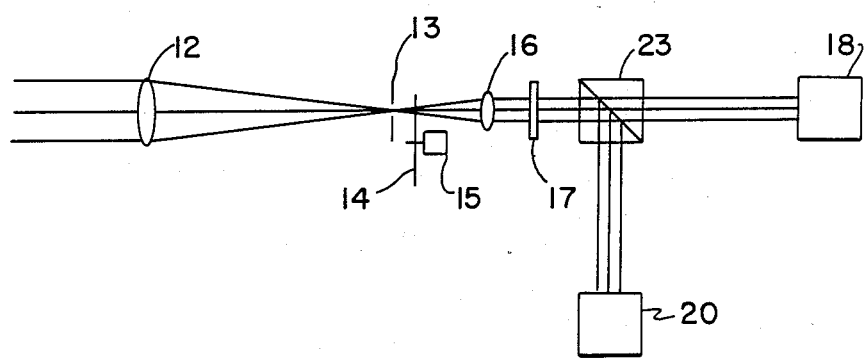
FIG. 9b illustrates an optical system in which an interference filter and a polarizing prism are used.

FIG. 9b illustrates an optical system for use in the detector 22 of FIG. 9a. A lens 12 focuses the radiant flux on an optical aperture 13, and the transmitted flux is collimated by another lens 16 and directed to polarizing prism 23. A bandpass filer 17 transmits a narrow spectral portion of radiation to the prism 23. Components of two different polarizations of radiation are transmitted or reflected toward detectors 18,20. A chopping blade 14 and a motor 15 form an optical chopper.

Figure 10:
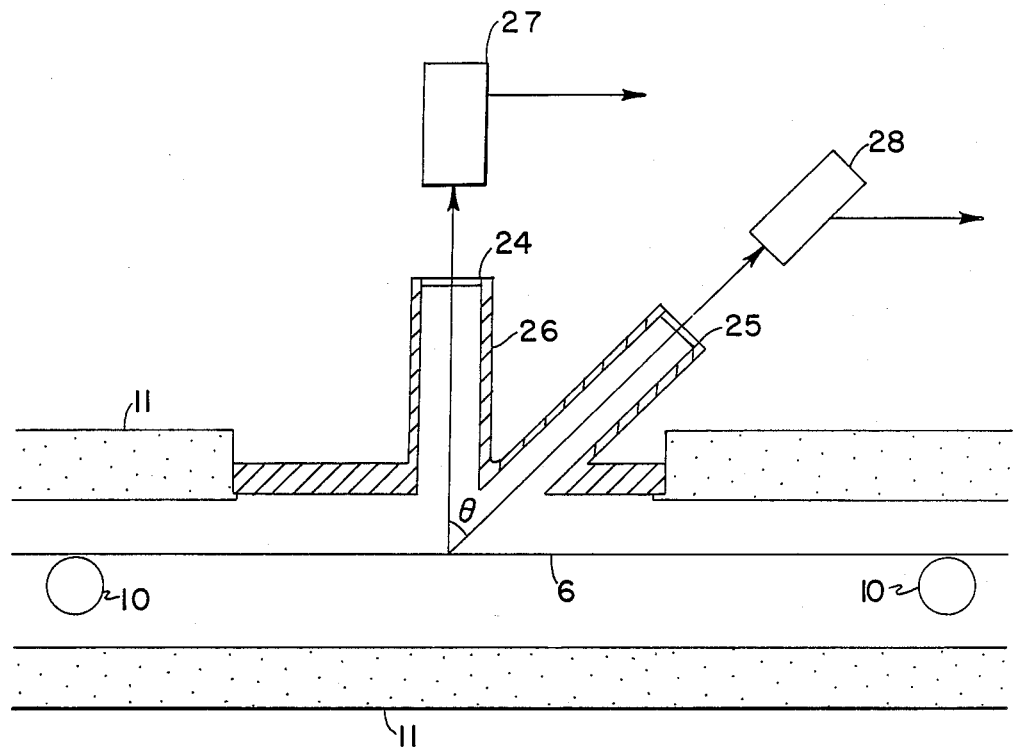
FIG. 10 illustrates an alternate embodiment of the invention in which two radiances are measured at different angles from the normal to the target material surface.

FIG. 10 illustrates another embodiment of this invention applied to a steel strip 6 in a continuous annealing furnace. Spectral radiances at the same wavelength are measured at different viewing angles $\theta$ by two detecting devices 27,28 through transmitting windows 24,25. Item 26 denotes a water cooled flange. Item 10 is a supporting roll and item 11 denotes the wall of the furnace. The detector viewing angle $\theta$ can also be adjusted for the optimum operation of the system considering the experimental data as well as practical engineering conditions.

Figure 11:
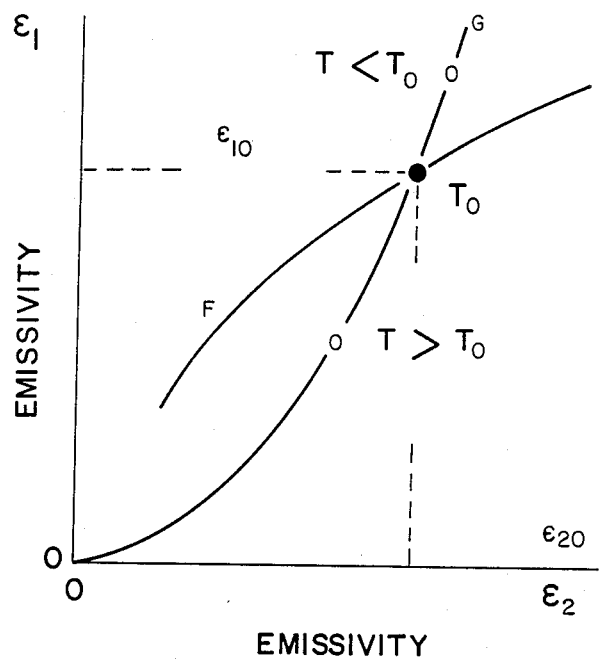
FIG. 11 illustrates the relationship between spectral emissivities based on temperature equations; and graphically illustrates an emissivity function.

The method of the present invention is described below with reference to FIGS. 11, 12 and 13.

Figure 12:
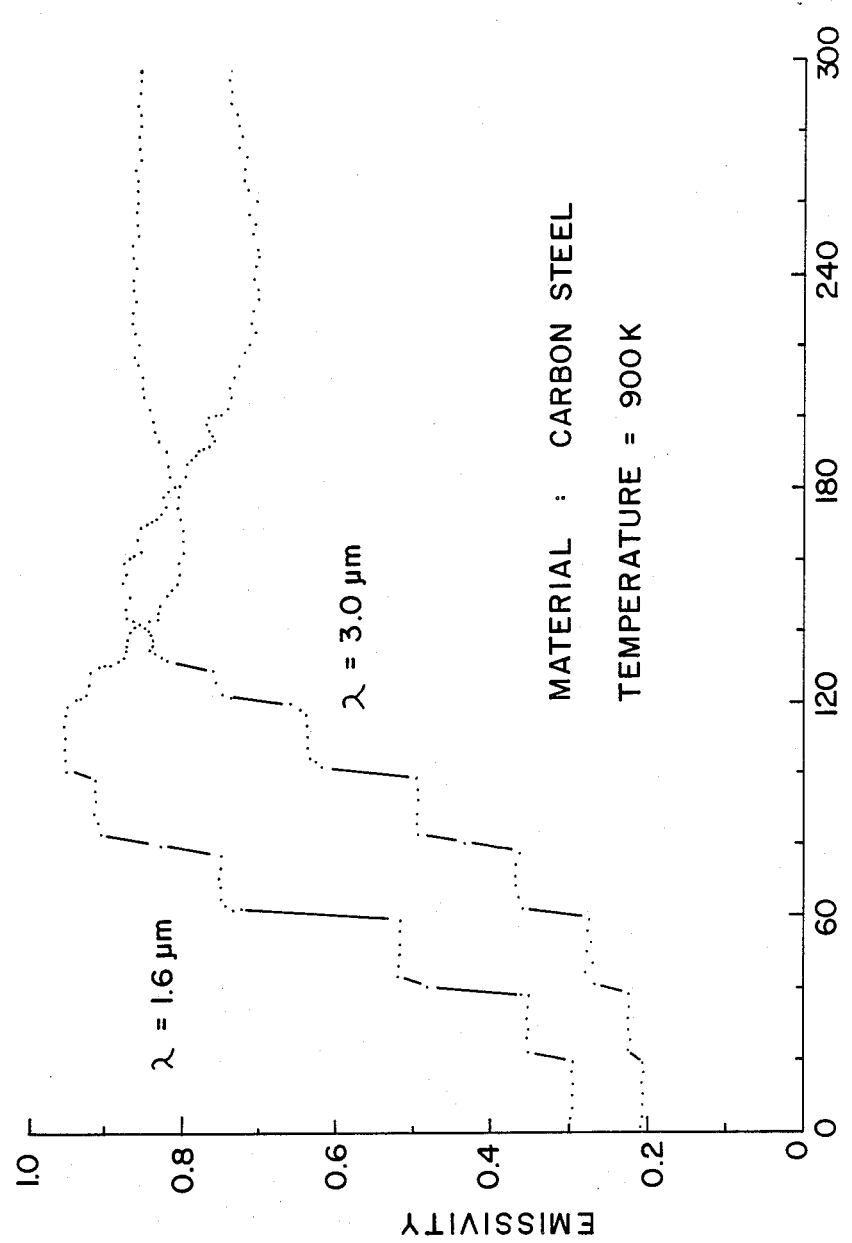
FIG. 12 graphically illustrates the variation of spectral emissivities of cold rolled carbon steel subjected to oxidation.
Figure 13:
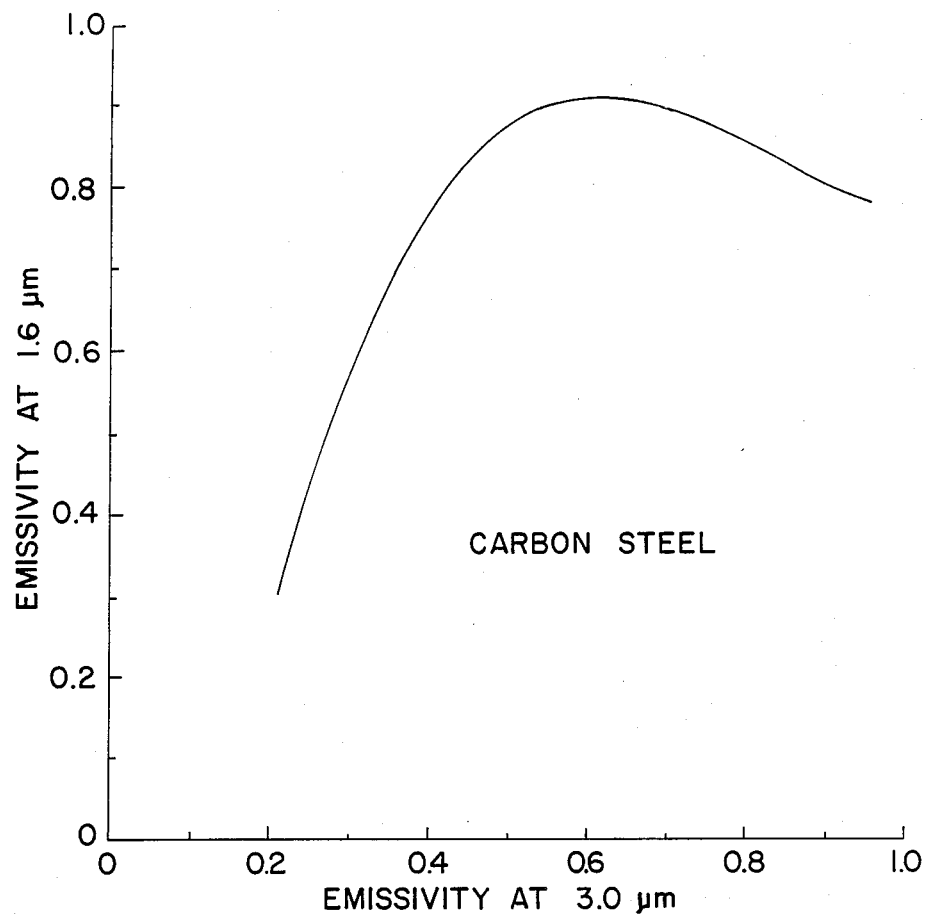
FIG. 13 illustrates the emissivity function for cold-rolled steel derived from the data of FIG. 12.

In practice, emissivity function data is generally gathered experimentally for a particular process which employs a specific target material e.g. carbon steel, as shown in FIG. 12. The emissivity function data is either stored as a table or defined mathematically, for example, in terms of a polynomial equation i.e., equation (16) illustrated graphically in FIG. 13 and as curve F in FIG. 11, and stored in a computer. Similarly, temperature equations (6) and (7) are stored in the computer for calculating emissivities based on observed spectral radiances $L_1$ and $L_2$ and an assumed target material temperature. Equation (15), derived from the temperature equations, is represented graphically as curve G in FIG. 11.

The method according to the present mention is a trial and error method whereby spectral radiances $L_1$ and $L_2$ are observed at two different conditions, e.g. two different wavelengths, and a target material temperature $T_i$ is assumed and inputted into the computer. Based on this imputed data, emissivities $\epsilon_1$ and $\epsilon_2$ are calculated using temperature equations (6) and (7). The calculated emissivities $\epsilon_1$ and $\epsilon_2$ represent a solution to equation (15) and lie on curve G of FIG. 11. If the assumed temperature $T_i$ is below the true temperature T of the target material the calculated emissivities will lie on curve G at a point above the emissivity function defined by curve F. Similarly, if the true target material temperature T is greater than the assumed temperature $T_i$, then the calculated emissivities will lie on curve G below curve F. In either case, a new target temperature is assumed until the calculated emissivities are in agreement within a predetermined error, represented by the intersection of curves F and G, i.e., the calculated emissivities from equations (6) and (7) simultaneously solve both equations (15) and (16). This trial and error procedure produces a unique value representing the true temperature T of the target material as shown in FIG. 11.

The invention may be put into practice in various ways and different methods for the actual numerical calculations will be readily apparent to these skilled in the art. However, the following numerical example, with reference to FIGS. 14 and 15, illustrates the method of the invention applied to the temperature measurement of cold rolled steel undergoing oxidation.

EXAMPLE 1

Figure 14:
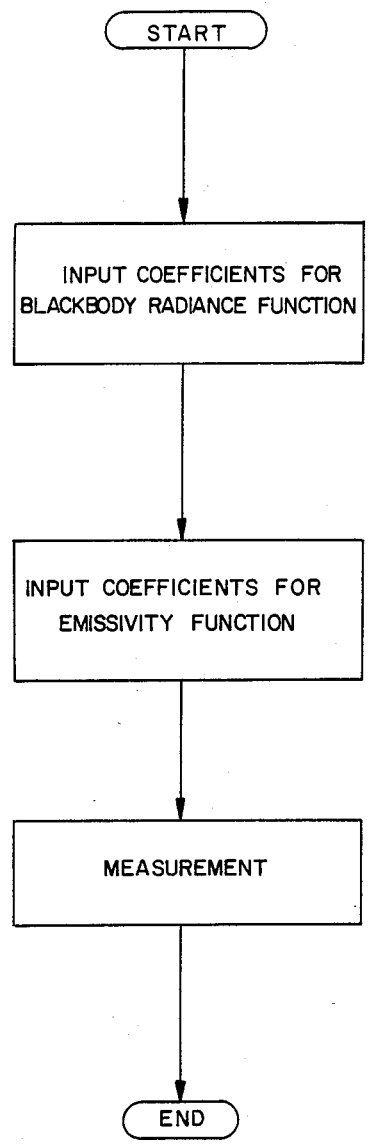
FIG. 14 is a block diagram illustrating the main program flow chart for numerically calculating surface temperatures of heated objects.
Figure 15:
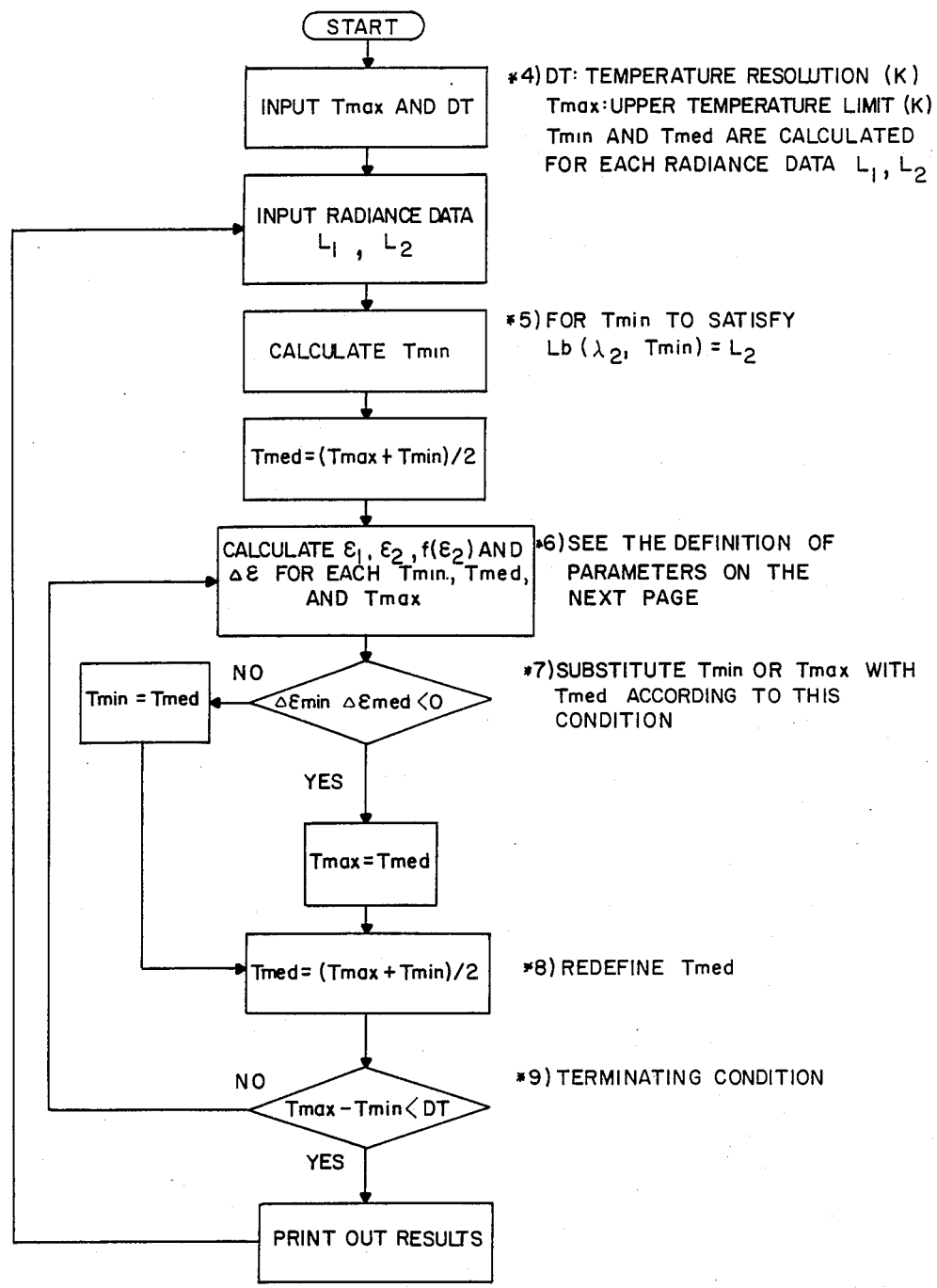
FIG. 15 is flow chart illustrating the iterative calculation program for determining surface temperatures according to the method of the invention.

A block diagram of the main numerical calculation program is illustrated in FIG. 14. A flow chart for the iterative numerical calculation of the target material temperature T and emissivities $\epsilon_1$ and $\epsilon_2$ is shown in FIG. 15.

As shown in the main program, a blackbody function and an emissivity function are defined prior to measurement of the spectral radiances. In this example, Wien's approximation, $L_b(\lambda,T) = K \exp(-C_2/\lambda T)$, is used for the blackbody function and a third order polynomial function, $$f(\epsilon_2) = \epsilon_1 = A_0 + A_1\epsilon_2 + A_2\epsilon_2^2 + A_3\epsilon_2^3$$

is used for the emissivity function. Emissivity function data was gathered experimentally (See, for example, FIG. 5) and the coefficients $A_0$, $A_1$, $A_2$ and $A_3$ were calculated and inputted into the main program.

In the iterative numerical calculation program, initial parameters for maximum, minimum and median values of temperature, defined as $T_{max}$, $T_{min}$ and $T_{med}$ are estimated and inputted into the program. $T_{med}$ is the numerical average of $T_{max}$ and $T_{min}$.

The temperature parameters correspond to emissivities $\epsilon_{2min}$, $\epsilon_{2max}$ and $\epsilon_{2med}$, respectively. In addition, the following emissivity limitation exists:

$$0 < \epsilon_{2max} < \epsilon_{2med} < \epsilon_{2min} = 1$$

Thereafter, two spectral radiances, $L_1$ and $L_2$, are measured at different conditions from the target material and emissivities $\epsilon_1$, and $\epsilon_2$ are calculated for each of the assumed temperatures $T_{max}$, $T_{min}$ and $T_{med}$, using the temperature equations $$\epsilon_{1min} = L_1/L_{b1}(T_{min}) \text{ and}$$

$$\epsilon_{2min} = L_2/L_{b2}(T_{min})$$

Identical equations are used for $T_{max}$ and $T_{med}$ to calculate maximum and median emmisivities. The emissivity function is then calculated using the polynomial function defined above and deviations, $\Delta\epsilon$, i.e. the difference between the emissivity function f($\epsilon_2$) and $\epsilon$, the calculated emissivities $\epsilon_{1min}$ and $\epsilon_{1med}$ are determined.

Thus, $\Delta\epsilon_{min} = \epsilon_{1min} - f(\epsilon_{2min})$ and $\Delta\epsilon_{med} = \epsilon_{1med} - f(\epsilon_{2med})$ As shown in flow chart FIG. 15, the deviations $\epsilon_{min}$ and $\epsilon_{med}$ are used to reset $T_{min}$ or $T_{max}$ for the subsequent iteration.

Accordingly, if the product of $\Delta\epsilon_{min} \times \Delta\epsilon_{med}$ is negative, then the current $T_{med}$ value is substituted into $T_{max}$ and a new $T_{med}$ calculated. Conversely, if the same product is positive, then the current $T_{med}$ is substituted into $T_{min}$ and a new value for $T_{med}$ is calculated. Thereafter, new values for $\epsilon_1$, $\epsilon_2$ and $\Delta\epsilon$ are calculated using the new values for temperature and the iterative calculation process repeats itself until the difference between $T_{max}$ and $T_{min}$ is less than some preset amount, usually less than 1° K depending on the criticality of the process being controlled. The average temperature $T_{med}$ at this point represents the true temperature of the target material according to the invention.

The invention in its broader aspects is not limited to the specific described embodiment and departures may be made therefrom within the scope of the accompanying claims without departing from the principles of the invention and without sacrificing its chief advantages.

What is claimed is:

1. A method of determining true temperature of a heated target material by its radiation based on prior knowledge of a relationship between a first spectral emissivity and a second spectral emissivity for said target material, said relationship being defined by a curve or mathematical equation describing a plurality of said first and second spectral emissivities determined at different spectral conditions, comprising measuring two spectral radiances from the target material at spectral conditions corresponding to said first and second spectral emissivities, iterating the following steps of assuming a temperature of the target material, then calculating a pair of spectral emissivities by dividing said two spectral radiances by two spectral blackbody radiances at said assumed temperature, until said pair of calculated spectral emissivities satisfy said relationship whereat said assumed temperature is the true temperature of said target material.

2. The method of claim 1, wherein the two radiances are measured at different wavelengths.

3. The method of claim 1, wherein the two radiances are measured at different viewing angles from the normal to the surface of said target material.

4. The method of claim 1, wherein the two radiances are measured at different directions of polarization.

5. The method of claim 1, wherein the two radiances are measured by at least two different conditions of wavelength, viewing angle and direction of polarization.

6. A method of determining temperature of a heated target material by its radiation, comprising the steps of:
   (a) determining a plurality of first and second spectral emissivities for a variety of surface conditions for the heated target material at different spectral conditions for each of said first and second spectral emissivities for determining a unique relationship between said first and second spectral emissivities, said relationship being defined by a curve or mathematical equation describing said plurality of first and second spectral emissivities;
   (b) measuring two radiances from said target material at two different spectral conditions;
   (c) calculating a pair of emissivities for said target material based on the measured radiances and an assumed target material temperature;
   (d) comparing the calculated pair of emissivities with the relationship determined in step (a); and
   (e) repeating steps (c) and (d) until the calculated pair of emissivities satisfy the unique relationship determined in step (a) at which point the assumed temperature is the true temperature of the heated target material.

7. The method of claim 6, wherein the two radiances are measured at different wavelengths.

8. The method of claim 6, wherein the two radiances are measured at different viewing angles from a plane normal to the target material surface.

9. The method of claim 6, wherein the two radiances are measured at different directions of polarization.

10. The method of claim 6, wherein the two radiances are measured at a combination of different spectral conditions.

* * * * *